June 3, 1930.  H. P. TOWNSEND  1,761,243
MACHINE FOR CUTTING MULTIPLE THREADS ON WOOD SCREWS
Filed Jan. 13, 1922  2 Sheets-Sheet 1
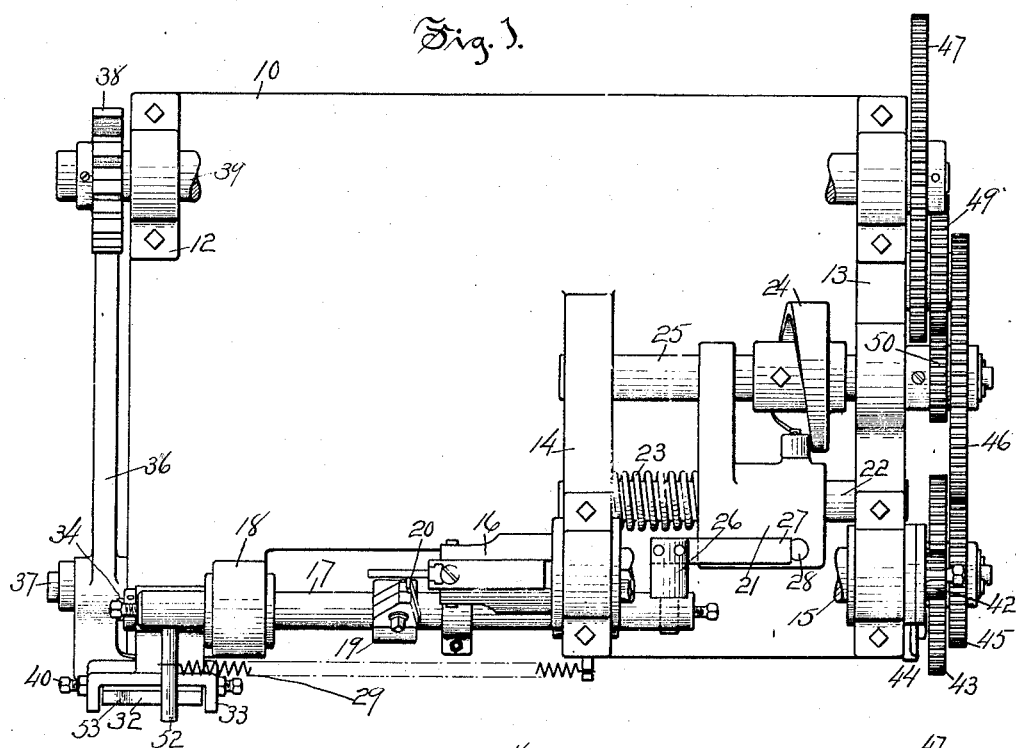
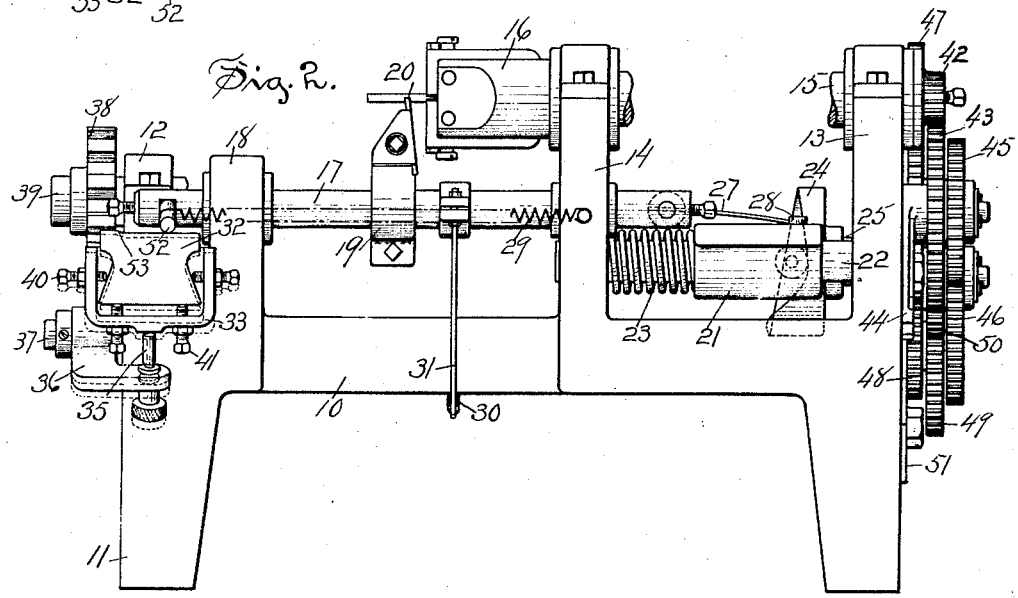
INVENTOR
Harry P. Townsend.
by
Arthur B. Jenkins,
ATTORNEY

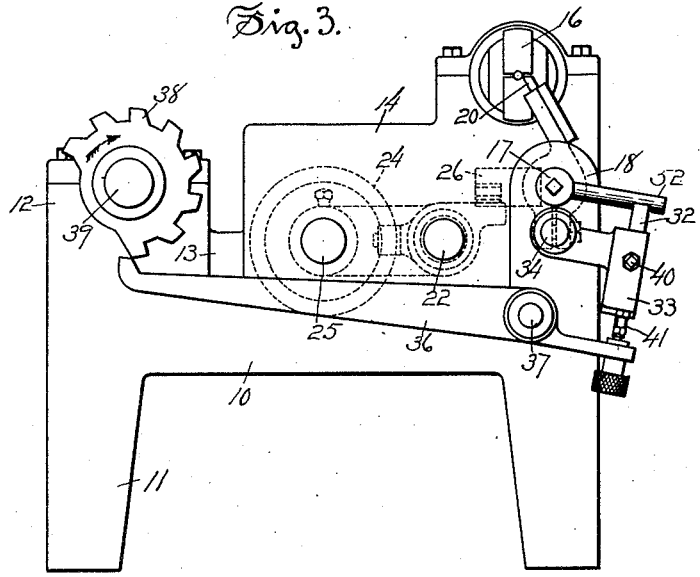
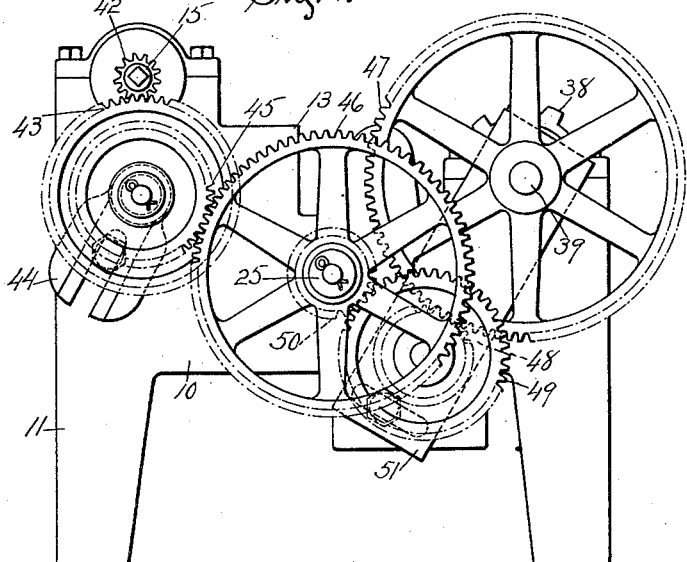
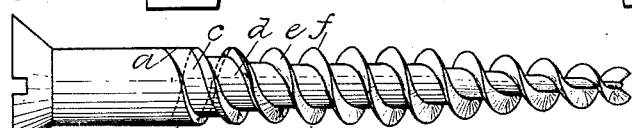
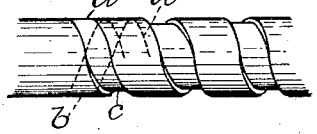

Patented June 3, 1930

1,761,243

UNITED STATES PATENT OFFICE

HARRY P. TOWNSEND, OF WEST HARTFORD, CONNECTICUT, ASSIGNOR TO THE H. P. TOWNSEND MANUFACTURING COMPANY, OF HARTFORD, CONNECTICUT, A CORPORATION OF CONNECTICUT

MACHINE FOR CUTTING MULTIPLE THREADS ON WOOD SCREWS

Application filed January 13, 1922. Serial No. 529,039.

My invention relates to the class of machines that are employed for cutting the threads on so called wood screws, and especially to a machine for producing multiple threads upon such screws, and an object of my invention, among others, is to produce a machine of this type in which the operation of the machine in producing screws with such multiple threads shall be rapid and efficient as compared with prior machines for doing such work.

One form of machine embodying my invention and in the construction and use of which the objects herein set out, as well as others, may be attained, is illustrated in the accompanying drawings, in which—

Figure 1 is a plan view of a machine embodying my invention with parts broken away, thereby showing only so much of such machine as is needed for a complete understanding of such invention.

Figure 2 is a view in front elevation of the same with parts broken off for the sake of clearness.

Figure 3 is an end view looking from the left of the machine as shown in Figure 1.

Figure 4 is an end view looking at the opposite end of the machine from that shown in Figure 3.

Figure 5 is a view of a screw illustrating the manner of carrying out my invention.

Figure 6 is a detail view of a portion of a screw further illustrating the manner of carrying out my invention.

Figure 7 is a detail view, scale enlarged, showing the curved path of the cutting tool in the cutting operation.

At the present time so called wood screws, that is screws having threads particularly equipped to enter wood or like material, are being produced with double threads, owing to the advantages of such construction in the operation of inserting a screw in wood or similar material. It has, however, for a long time, been a problem to produce such double-threaded screws rapidly enough to reduce the cost to a minimum, that is, a cost approaching that of production of the ordinary single threaded wood screws. Machines for producing these double-threaded wood screws have been variously equipped with cutting mechanism for the purpose, among such equipment being a machine in which one of the threads is cut from beginning to finish and then the screw blank being turned just half way around in the chuck the other thread is cut from the beginning to the end. This operation is slow owing, among other reasons, to the time required to index the blank in the chuck. Another mechanism for producing such multiple threaded wood screws comprises a machine in which two tools are employed working simultaneously upon opposite sides of the screw blank, each cutting its particular thread, but such operation is comparatively slow owing to the force exerted by the two tools and consequently the reduced speed at which the blank must be rotated. Moreover such mechanism is defective for the reason that there is not sufficient surface left between the cutting tools to afford a proper support for the blank during the cutting operation.

By the use of my improved machine, as illustrated and described herein, I am able to produce a multiple threaded wood screw at a rate closely approaching that of machines heretofore employed for producing single threaded wood screws, my improved machine being illustrated in the drawings herein in which the numeral 10 indicates the bed of the machine supported as upon legs 11, end supports 12—13 rising from the bed at its opposite ends and containing bearings for shafts for driving various parts of the mechanism, an intermediate support 14 also rising from the bed in position to support certain parts of the mechanism. A work holding spindle 15 is mounted in the supports 13 and 14, such spindle being broken away to disclose other parts, this spindle, however, being of ordinary construction having the usual pulley to impart continuous and uninterrupted rotation to said shaft and comprising a chuck 16, also of ordinary construction, for holding the screw blanks.

A tool bar 17 is mounted for reciprocating movement in the support 14 and in a post 18, the latter rising from the bed at its front edge and near one end, as illustrated in Figures 1 and 2 of the drawing. A tool head 19 is adjustably mounted on the bar 17 and is provided with any ordinary means for receiving and holding a thread cutting tool 20 in position to cut the threads upon a screw blank held in the chuck 16. Endwise reciprocating movement is imparted to the tool bar 17 by means of a tool bar actuator 21 mounted for sliding movement upon an actuator supporting bar 22 secured to the supports 13 and 14, an actuator spring 23 being employed to move the actuator in one direction, and a threading cam 24 being employed to move the actuator in the opposite direction, such cam being mounted on a threading cam shaft 25 rotatably mounted in bearings in the supports 13 and 14. An actuating post 26 projecting from the side of the tool bar 17 has a finger 27 adapted to engage an actuating stud 28 on the top of the actuator 21. The actuator, through this mechanism, moves the tool bar 17 in one direction, as in a cutting pass, and a spring 29 moves the bar in the opposite direction, as in an idle pass.

The tool bar 17 is turned in one direction as by means of a spring 30 secured to a rod 31 projecting from the bar, and as shown in Figure 2 of the drawings, and said bar is turned in the opposite direction as by means of a shoe 32 adjustably mounted in a frame 33 supported on a stud 34 projecting from the side of the post 18, and as shown in Figure 3. The lower edge of this frame rests against an adjustable post 35 supported by a die operating lever 36 pivotally supported on the end of the frame as by a stud 37, the end of said lever opposite the post 35 being in contact with a forming cam 38 secured to a cam shaft 39 that may be driven from any suitable source of power and which is mounted in the end supports 12 and 13 and with its center portion broken away as unnecessary to a complete understanding of the invention disclosed herein. The shoe 32 may be adjustably positioned in the frame 33 as by means of adjusting screws 40—41, as shown in Figure 2 of the drawings.

The machine thus far described is practically of well known construction and a further and more detailed description is, therefore, thought to be unnecessary to a complete understanding of my invention. It may be stated, however, that in prior machines of this type adapted for the making of wood screws a different number of complete rotations have been imparted to the spindle to correspond with a certain different number of passes of the cutting tool in cutting a thread, this in order that the cutting tool shall begin its succeeding operations at the same peripheral point on the blank in performing its successive cuts upon a certain thread upon the blank. In equipping a machine with my invention I provide means whereby the spindle supporting the blank is given a number of complete rotations or turns and in addition thereto a fractional turn to each pass of the tool, which fraction is determined by the number of threads being formed on the blank, in the machine as herein illustrated and described, a definite number of full rotations being imparted to the spindle to cut the two threads on the blank, and then an added fractional turn to each tool pass, to wit: one-half as illustrated and described herein, also being imparted to said spindle. For instance: Consider the blank to have four complete rotations at a single pass of the cutting tool, the blank has imparted to it four and one-half rotations at a single pass of the cutting tool, so that the cutting tool at the completion of its pass, that includes a to and fro movement, will begin its operation on the opposite side of the blank from that at which it began to cut in the next preceding pass. In other words, referring to Figures 5 and 6 of the drawings in which a double-threaded wood screw as made on my improved machine is illustrated, the cutting tool in making its first pass will begin to operate at, say the location $a$ on the blank, and this blank being given four and one-half rotations, as the cutting tool passes from the location $a$ to the point of the blank and back again it will begin its second operation at the location $b$, the tool in its first pass cutting a portion of the groove $c$ and in its second pass a portion of the groove $d$. For example: After the first pass of the tool to cut a portion of the groove $c$, as the tool passes from this end of the blank to the point and back again, the blank will be given a certain number of complete rotations and an added half rotation and the tool will thus begin the cutting of its second pass at $b$ to cut the first portion of the groove $d$, and in this pass of the tool from the location $b$ to the point and back again the blank will have imparted to it the same number of complete rotations as above, plus the added half rotation to cause the tool to again begin at the location $a$ for its second operation on the groove $c$, and this operation will be repeated until the two grooves $c$ and $d$ have been completely cut and the threads $e$ and $f$ have thus been completed.

The operation of the machine is obtained by driving power applied to the spindle 15, which spindle has a pinion 42 that meshes with a timing gear 43 mounted on a plate 44 adjustably secured to the side of the machine. A timing pinion 45 on the gear 43 meshes with a threading gear 46 secured to the threading shaft 25. The plate 44 enables different timing gears and pinions to be employed that will impart such number of complete rotations plus the fractional part of a rotation required for the spindle 15 to impart such rotations to the screw blank as may be desired, the pivotal mounting of the plate permitting the employment of gears and pinions of different sizes to enable them to properly mesh with the driving and driven members.

In addition to effecting different relative fractional rotations of the blank as compared with the passes of the threading tool it is necessary that the shoe 32 shall be operated synchronously with the rotating movements of the blank and with the passes of the thread cutting tool, and to this end the shaft 39 bearing the forming cam 38 that operates the shoe 32 has a gear 47 meshing with a timing pinion 48 to which is secured a timing gear 49 meshing with a cam shaft driving pinion 50 secured to the threading gear 46, the pinion and gear 48—49 being mounted on a gear supporting plate 51 pivotally mounted at one end as on the cam shaft 39 and adjustably attached at its other end to the frame of the machine, the showing of this plate being omitted from Figure 1 for the sake of clearness. This pivoted plate enables toothed elements of different sizes to be employed and properly meshed to obtain the desired results.

From the mechanism herein described I have provided a machine in which the spindle supporting the blanks for operations of the threading tool is rotated, in addition to the number of complete rotations required for a single pass of the tool for operation upon a thread, a fraction of a turn, which fraction is determined by the number of threads being cut upon the blank, and by the arrangement of gears herein described the rotation of the spindle, and consequently of the blank, may be timed with respect to the passes of the tool to cause such tool to work at each successive pass upon each of the threads being cut.

My invention is essentially applicable to the cutting of wood screws, in which operation the threading tool traverses at the beginning and end of its operation a curved path, the movement of such cutting tool being governed in its operation by the plate 32 that partially rotates the bar 17 by means of a forming rod 52 projecting from the bar and resting in contact with the plate 32. This plate imparts to the rod 52 and consequently to the cutting tool 20 a movement in a curved path, as illustrated in Figure 7, the frame 33 being raised at the beginning of the cutting operation by the cam 38 from the position indicated by the dotted outline in Figure 2, whereby the cutting tool travels on a curved path, represented by $g$, as the frame is raised, the tool thus cutting gradually deeper into the blank. The frame then remains in this position for a short distance while the tool travels in a straight path, as illustrated by $h$, the end of the lever 36 being in contact with one of the higher portions of the cam during this period. At the completion of the cutting pass to form the point of the screw the rod 52 passes up the incline 53 on the plate 32 thus imparting to the tool a movement represented by the curve $i$, whereby the cutting tool is moved inwardly to the axis of the blank, or nearly to said axis. It will thus be seen that the tool in its cutting pass travels first on a curve as represented by $g$ and then on a straight path as represented by $h$ and then on a curved path, as represented by $i$, the latter at the point of the screw and to finish the same.

The machine being in operation the spindle or shaft 15 is continuously rotated by means of a pulley (not shown) thereon. The cutting tool 20, by means of the plate 32 actuated by the cam 38, is engaged with the blank, as shown in Figure 2, and by means of the cam 24 is moved along said blank toward the free end thereof. In this movement the plate 32 actuated by the cam 38 causes the tool to sink slightly into the blank, as at the point $g$ and then the central portion of the plate causes the tool to cut a groove of even depth for a certain distance along the blank, as at $p$ and then the curved part of the plate causes the cutting tool to pass partially around the end of the blank in a spiral direction to form the point thereon. After the tool has thus been moved along the blank to the free end thereof, the cam 24 permits the spring 29 to move the tool in the opposite direction, and during this movement the parts are so timed in their rotation that the blank is rotated to locate a point thereon diametrically opposite the point of beginning of the cut just described, and at the point where the cutting tool will again begin to cut on the opposite side of the blank, when the operations are repeated until the threads are cut to the proper depth.

In accordance with the provisions of the patent statutes I have described the principles of operation of my invention, together with the apparatus which I now consider to represent the best embodiment thereof; but I desire to have it understood that the apparatus shown is only illustrative, and that the invention may be carried out by other means and applied to uses other than those above set out.

I claim—

1. An operating mechanism for a wood screw machine comprising a spindle, means for rotating the spindle, a shaft, means for feeding the shaft longitudinally, means for oscillating the shaft on its axis, and intermeshing gears between the spindle and the shaft reciprocating and oscillating means, said gears having such ratio that the spindle turns one-half of a revolution more than a full number of revolutions with relation to the reciprocations and oscillations of the shaft, whereby a tool carried by the shaft will start cutting a blank carried by the spindle alternately on diametrically opposite sides.

2. An operating mechanism for a wood screw machine comprising a spindle, means for rotating the spindle, a rotatory and reciprocatory shaft, a cam for feeding the shaft longitudinally, a cam and connections for oscillating the shaft axially, and intermeshing gears interposed between the spindle and said cams, said gears having such ratio that the spindle turns one-half of a revolution more than a full number of revolutions with relation to the reciprocations and oscillations of the shaft.

3. An operating mechanism for a wood screw machine comprising a rotatory blank spindle, means for rotating the spindle, a rotatory and reciprocatory tool feed shaft, a cam for feeding the shaft longitudinally, and intermeshing gears between the spindle and cam, said gears having such ratio that the spindle turns one-half of a revolution more than a full number of revolutions with relation to the revolutions of the cam.

4. An operating mechanism for a wood screw machine comprising a rotatory blank spindle, means for rotating the spindle, a rotatory and reciprocatory tool feed shaft, a cam for feeding the shaft longitudinally, and intermeshing gears between the spindle and cam, said gears having such ratio that there is a fractional difference between the relative rotations of the spindle and the feed cam.

5. An operating mechanism for a wood screw machine comprising a rotatory blank spindle, means for rotating the spindle, a rotatory and reciprocatory tool feed shaft, a cam for feeding the shaft longitudinally, and intermeshing gears including an idler and change gears interposed between the spindle and the cam, said change gears having such a number of teeth that the spindle turns a number of full revolutions and a fraction of a revolution more to one revolution of the cam.

6. An operating mechanism for a wood screw machine comprising a rotatory blank spindle, means for rotating the spindle, a rotatory and reciprocatory tool feed shaft, a cam for feeding the shaft longitudinally, and intermeshing gears including an idler and a change gear and pinion having such ratio to each other and to the gears with which they mesh that the spindle turns a number of complete revolutions and one-half more to each complete revolution of the cam.

7. An operating mechanism for a wood screw machine comprising a rotatory blank spindle, means for rotating the spindle, a rotatory and reciprocatory tool feed shaft, a cam for feeding the shaft longitudinally, a swinging profile cam for oscillating the shaft axially, a cut cam for swinging the profile cam, and intermeshing gears between the spindle and the feed and cut cams for driving them synchronously, said gears having such ratio that the spindle turns a number of full revolutions and a fraction more for each action of said cams.

8. An operating mechanism for a wood screw machine comprising a spindle, means for rotating the spindle, a rotatory and reciprocatory shaft, a cam for feeding the shaft longitudinally, a cam and connections for oscillating the shaft axially and intermeshing gears interposed between the spindle and said cams, said cams having such ratio that the spindle turns a fraction of a revolution more than a full number of revolutions with relation to the oscillations of the shaft.

HARRY P. TOWNSEND.